United States Patent

D'Andrea

[19]

[11] Patent Number: 6,053,678
[45] Date of Patent: Apr. 25, 2000

[54] ROTARY TOOL HOLDER WITH A BALANCE DEVICE

[75] Inventor: Ermanno D'Andrea, Lainate, Italy

[73] Assignee: D'Andrea S.P.A., Lainate, Italy

[21] Appl. No.: 09/266,143

[22] Filed: Mar. 10, 1999

[30] Foreign Application Priority Data

Apr. 30, 1998 [IT] Italy .................................. MI98A0941

[51] Int. Cl.[7] .................................................. B23B 31/02
[52] U.S. Cl. ........................ 409/141; 74/573 R; 408/143; 409/234
[58] Field of Search .................................... 408/143, 238, 408/239 R, 710; 409/141, 234; 74/573 R

[56] References Cited

U.S. PATENT DOCUMENTS

| 4,626,144 | 12/1986 | Berner ...................................... 408/143 |
| 5,033,923 | 7/1991 | Osawa ...................................... 409/234 |
| 5,074,723 | 12/1991 | Massa et al. .............................. 408/143 |
| 5,096,345 | 3/1992 | Toyomoto ................................. 409/234 |
| 5,116,194 | 5/1992 | Pfalzgraf et al. ......................... 408/143 |
| 5,125,777 | 6/1992 | Osawa ...................................... 409/234 |
| 5,263,995 | 11/1993 | Mogilnicki et al. ..................... 408/143 |
| 5,382,122 | 1/1995 | Mihic ....................................... 409/141 |
| 5,478,177 | 12/1995 | Romi ....................................... 408/143 |
| 5,810,527 | 9/1998 | Jager et al. .............................. 408/143 |
| 5,902,078 | 5/1999 | Kaiser et al. ............................ 408/143 |

*Primary Examiner*—Daniel W. Howell
*Attorney, Agent, or Firm*—Darby & Darby

[57] ABSTRACT

A rotary tool holder (1) with a balance device, having a cylindrical body (5) containing a T-section circumferential slot (7) and balance weights (8) in the shape of circular sectors attached with a snap action to the circumferential slot (7), the weights (8) being moveable and angularly positionable relative to the body (5) of the tool holder (1).

5 Claims, 4 Drawing Sheets

ROTARY TOOL HOLDER WITH A BALANCE DEVICE

The invention relates to a rotary tool holder with a balance device.

The balance device comprises balance weights that are positionable relative to the body of the tool holder.

It is known that in order to reduce machining times, machine tools capable of very high spindle rotation speeds are used at present, varying for example from 20,000 revolutions per minute to 60,000 revolutions per minute.

In these machines the tools must be carefully balanced to ensure that while the spindle is rotating, vibrations do not damage the spindle bearings and affect the quality of the surface of the machined product.

To solve these problems, use is now made of tool holders containing radially arranged tapped holes. Set screws or dowels of defined mass are screwed into these tapped holes.

The known tool holder is balanced by varying the positions of the set screws in the tapped holes.

This known tool holder has the disadvantage that balancing is done by successive approximations.

A further problem is that with this known tool holder it is difficult to adjust the balance with precision because it is difficult to adjust the positions of the balancing set screws with precision relative to the axis of rotation of the tool holder.

Also known are tool holders having a plurality of eccentric rings keyed to the body of the tool holder. These known tool holders permit balancing of the spindle by adjustment of the angular position of the eccentric rings relative to the body of the tool holder.

Once again, these known tool holders give insufficiently precise balancing for present-day spindle rotation speeds.

Moreover, these known tool holders employ a complicated arrangement for locking the relative positions of the eccentric rings and are therefore complicated to build and difficult to use.

It is an object of the present invention to obviate the problems of the prior art, as enumerated above, and to provide a tool holder with a built-in balance device that is simple to build and easy to use.

A second object of the invention is to provide a tool holder with a balance device capable of high precision of adjustment.

The object of the invention is achieved by means of a rotary tool holder fitted with a balance device having balance weights that are positionable relative to the body of the tool holder, wherein the body of the tool holder possesses a T-section circumferential slot, the slot houses balancing weights having in section the form of a U, the arms of the body of the U are elastically deformable and possess terminal enlargements that fit into the undercut part of the slot, and the body of each weight contains a tapped through hole that takes a set screw for locking it to the slot.

One of the advantages of the invention can be seen in the fact that the balance device is built into the body of the tool holder.

The tool holder is therefore simple to construct and takes up little space.

The circumferential slot does not affect the general geometry of the body of the tool holder and does not require the addition of complicated production steps in the manufacture of the tool holder.

The tool holder produced in accordance with the invention is also easy to use.

By inserting the weights into the slot and simply adjusting the angular position of the balance weights in the slot, it is possible to shift the centre of gravity of the tool holder by the desired distance from its axis of rotation in order to balance the tool holder with the desired degree of precision. With the proposed tool holder it is a simple matter to perform repeated balancing operations, e.g. as the tool suffers wear.

In order to permit precise adjustment of the angular position of the balancing weights, there is a graduated scale on one edge of the circumferential slot and a vernier scale is provided on the balance weights.

In order to limit the size of the balance device, the circumferential slot completely houses the body of the balancing weights.

One other advantage of the invention can be seen in the fact that the device of the invention is extremely safe. This is because even if the operator who is balancing the tool holder forgets to lock the weights with the set screws, the balance weights cannot come out of the slot during rotation of the tool holder since the undercut connection between the enlargements of the spring arms and the slot prevents the accidental escape of the weights from the slot.

The subject devised in accordance with the present invention will be described below in greater detail and illustrated with the aid of an embodiment which is provided purely by way of example in the attached drawings, in which.

Figure 1:
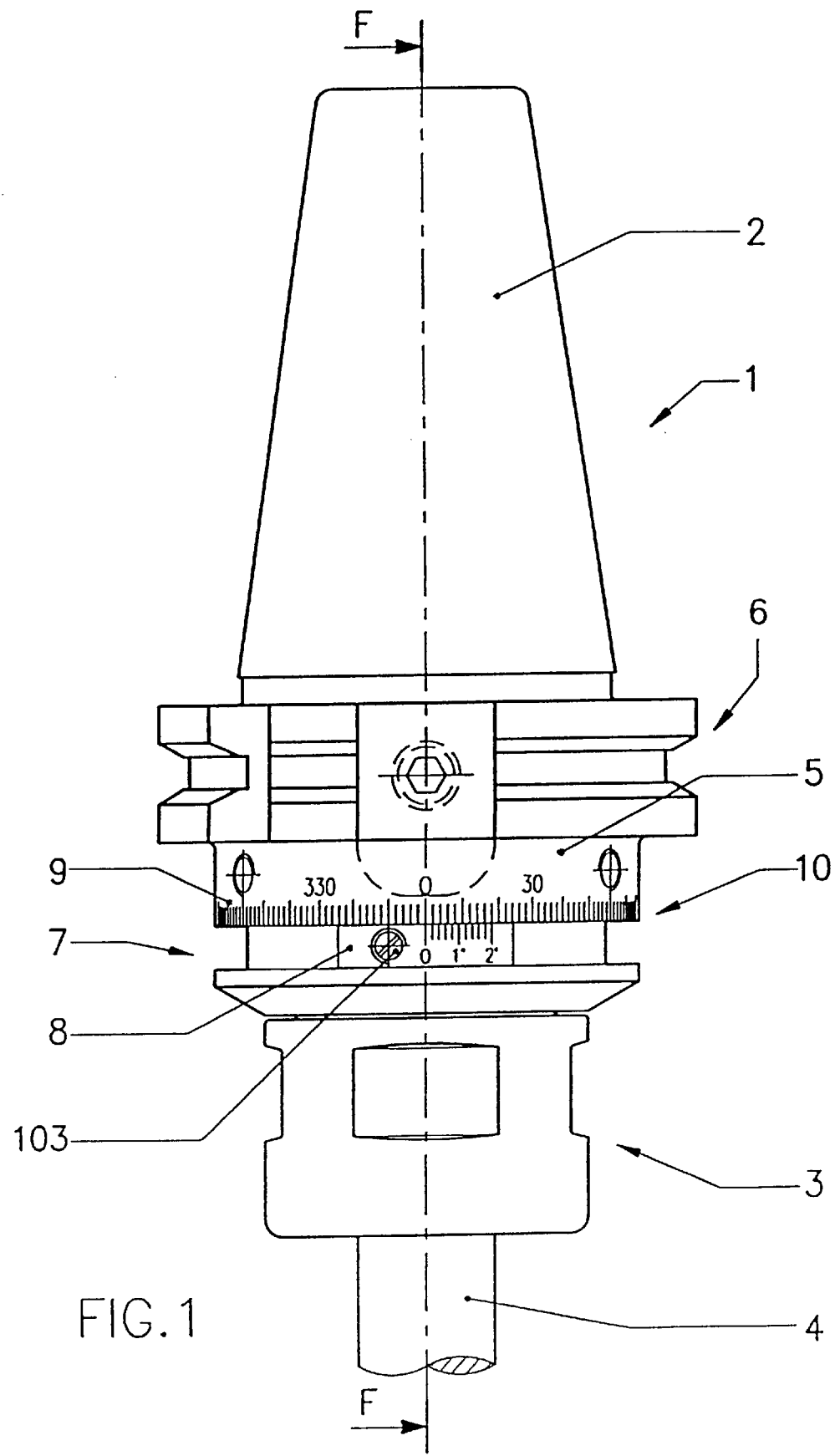
FIG. 1 shows, in a partially sectioned view, a tool holder connected to the shank of a tool.
Figure 2:
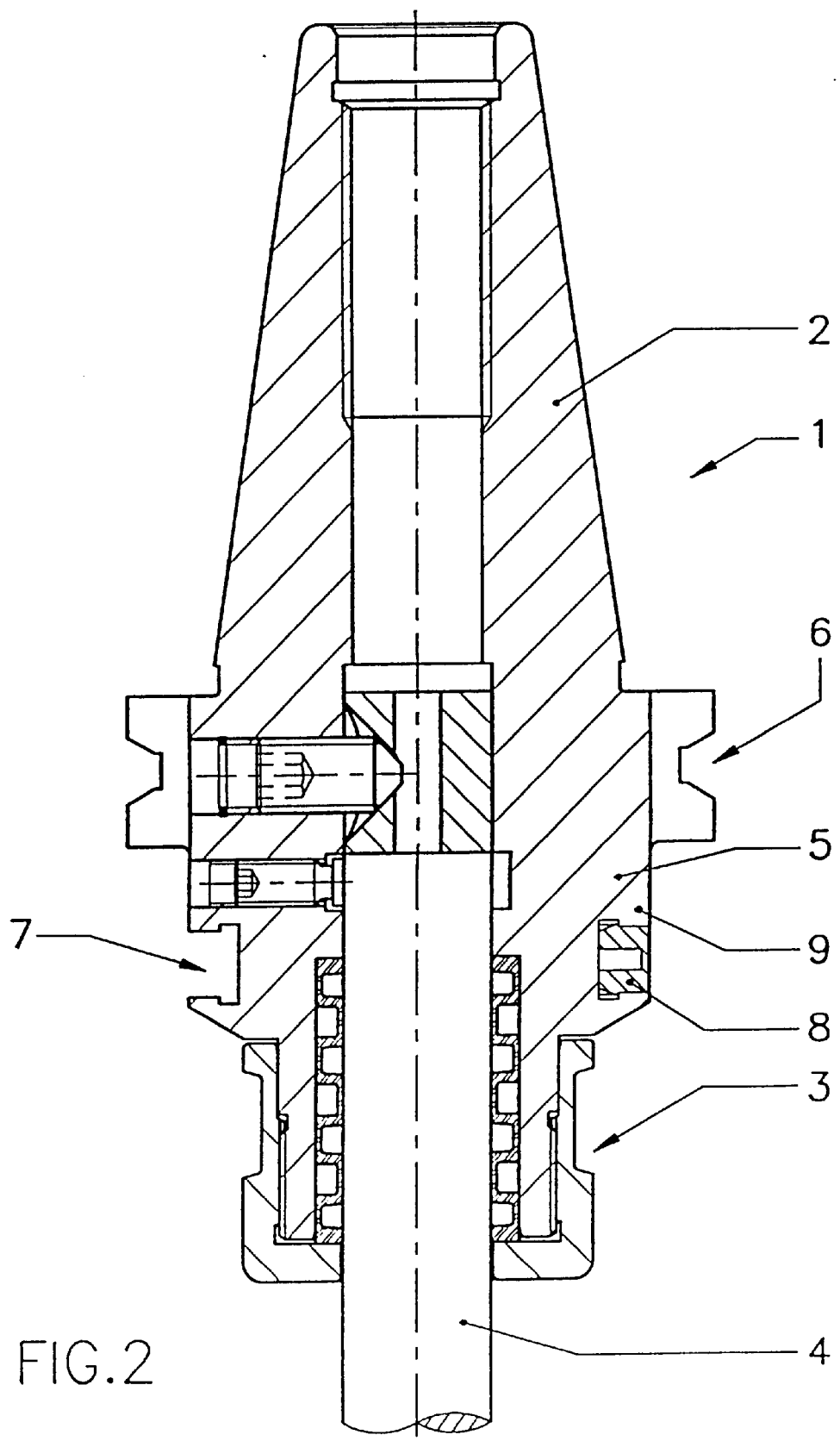
FIG. 2 shows the section through the tool holder of FIG. 1 on plane F—F.

In FIGS. 1 and 2 it is possible to see a tool holder 1 of the type having an upper taper 2 for connection to the spindle of the machine tool and a device 3, known per se, for locking the shank 4 of a tool.

The body 5 of the tool holder 1 has devices 6 for securing it to the spindle.

In the body of the tool holder is a circumferential slot 7. The circumferential slot 7 houses balance weights 8.

The circumferential slot 7 and balance weights 8 will be described in greater detail below.

Advantageously, the balance weights 8 are two or three or four in number and, prior to the balancing operations, are arranged equidistantly in the slot.

There is advantageously a graduated scale 10 all around the edge 9 of the slot 7.

Figure 3:
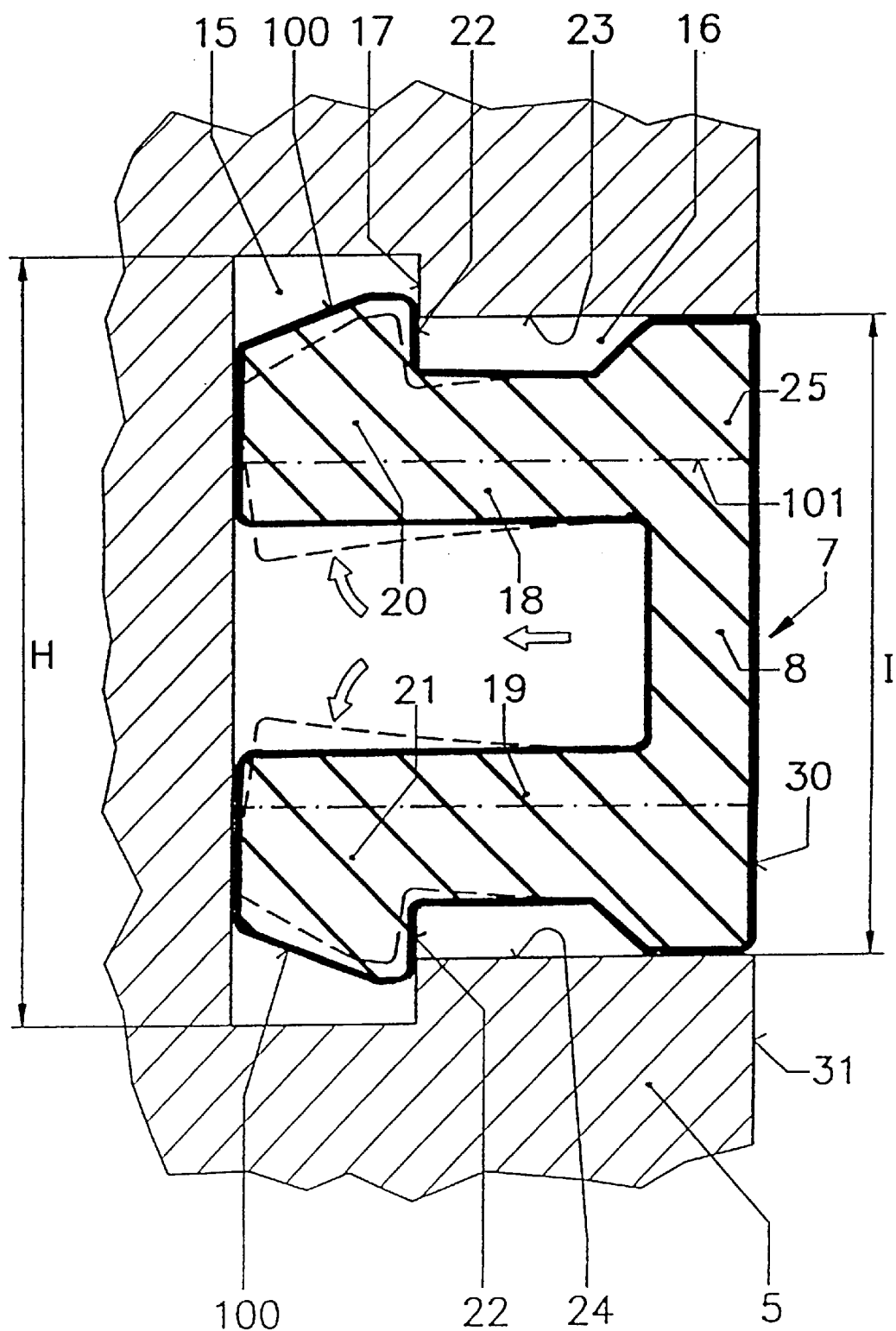
FIG. 3 shows in section a detail of the balance device.

FIG. 3 shows the constructional details of the circumferential slot 7 and of the balance weights 8.

The circumferential slot 7 forms an inner annular space 15.

The inner annular space 15 is wider than the entrance opening 16 of the slot 7.

The height H of the annular space 15 is therefore greater than the height H of the opening 16.

The annular space 15 meets the opening 16 via an undercut surface 17.

Consequently the circumferential slot 7 defines a T section in the body 5 of the tool holder.

The balance weight 8 is U-sectioned.

The arms 18, 19 of the body of the U are elastically deformable.

The outer surface 30 of the arms 18, 19 is preferably at a distance from the surface 23, 24 of the opening 16.

At the free ends of the arms 18, 19 are enlargements 20, 21.

The enlargements 20, 21 fit into the annular space 15.

The outer surface 22 of the enlargements is designed to butt against the undercut surface 17 of the annular space 15.

The edges of the terminal enlargements 20, 21 are externally tapered to form mutually convergent surfaces 100. The convergent surfaces 100 are designed to assist the insertion of the balance weight 8 into the opening 17 of the circumferential slot 7.

The base 25 of the balance weight 8 engages laterally with the surfaces 23, 24 defining the entrance opening 16 of the slot 7.

When fully housed in the circumferential slot 7, the balance weight 8 advantageously has its outer surface 30 flush with the surface 31 of the body 5 of the tool holder 1.

The body of the balance weight 8 contains a tapped through hole 101. The tapped hole 101 is situated between the spring arms 18, 19.

The tapped hole 101 houses a set screw 103 for locking the weight 8 in the slot 7.

Figure 4:
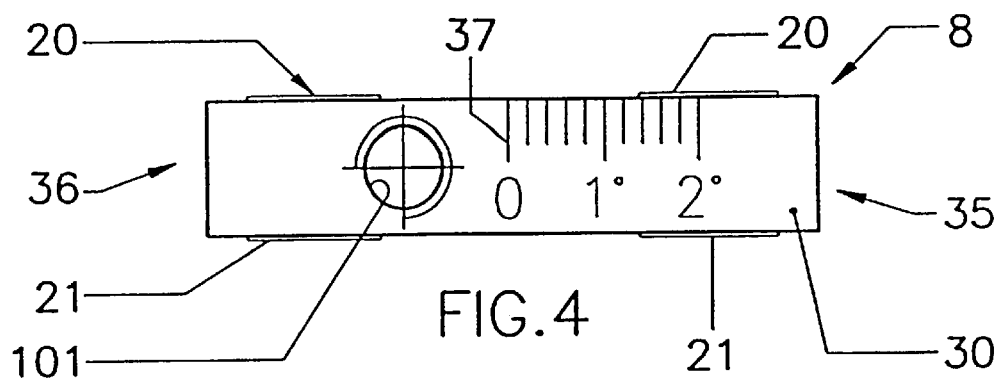
FIG. 4 is a view of a balance weight.
Figure 5:
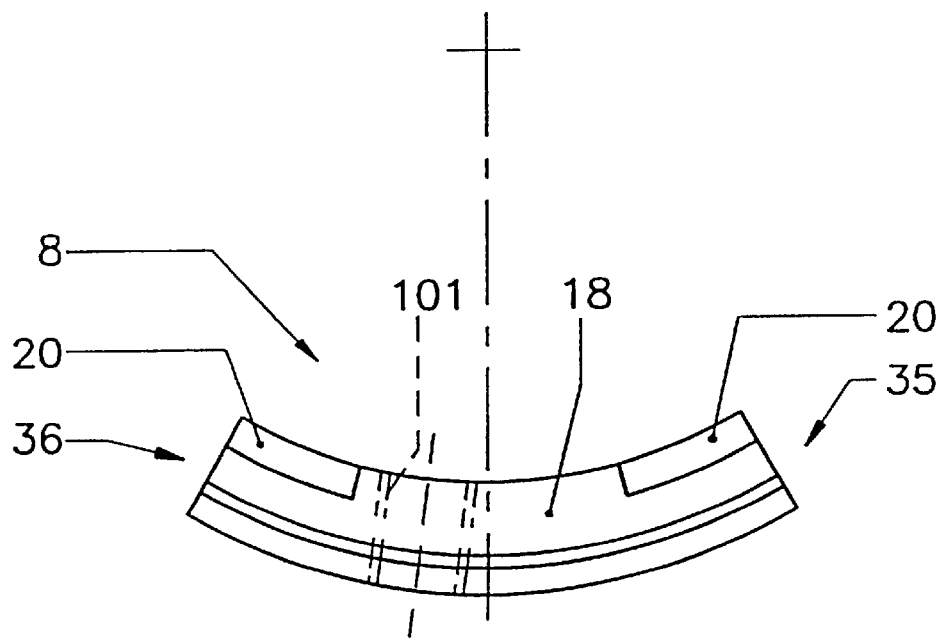
FIG. 5 is a top view of the balance weight of FIG. 4.
Figure 6:
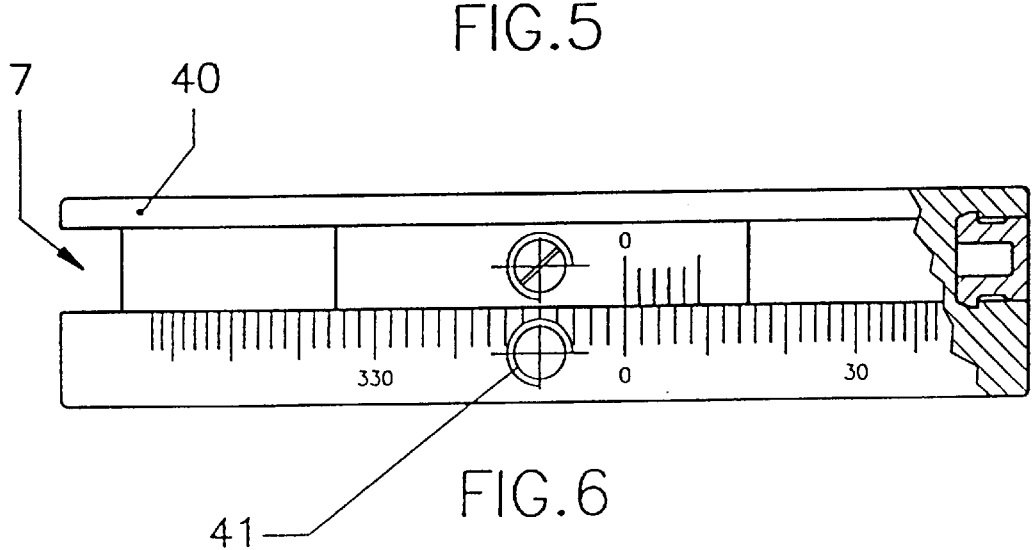
FIG. 6 shows, in a partially sectioned view, a balance ring for fitting to the cylindrical body of a tool holder.

Shown in FIGS. 4, 5 and 6 is one particular embodiment of the balance weight 8.

The balance weight 8 is in the form of a sector of a cylinder.

Extending from the concave side of the body of the weight 8 are mutually parallel spring arms 18, 19. External enlargements 20, 21 are located in the vicinity of the ends 35, 36 of the spring arms 18, 19.

The surface 30 of the base 25 of the balance weight 8 displays a vernier scale 37.

The graduated scale 37 can advantageously be placed alongside the graduated scale 10 present on the edge 9 of the circumferential slot 7.

FIG. 6 shows a different embodiment of the invention.

The circumferential slot 7 is formed in an annular body 40 which connects removably to a cylindrical seat present on the body 5 of the tool holder 1.

The annular body 40 includes a tapped hole 41 that takes a set screw that can be connected with a corresponding tapped hole present in the cylindrical seat of the body 5 of the tool holder 1.

The operation of the invention will now be described with the assistance of FIGS. 1 and 3.

Depending on the severity of the imbalance and on the desired sensitivity of the balancing operation, balance weights 8 of defined material and width are inserted in the slot 7.

When the convergent surfaces 100 of the terminal enlargements 20, 21 are placed in the opening 16 of the circumferential slot 7 and the outer surface 30 of the base 25 is pressed, the arms 18, 19 deform elastically.

As the arms 18, 19 deform elastically the enlargements 20, 21 move toward each other and enable the weight 8 to be inserted into the opening 16. The insertion of the weight 8 into the slot 7 continues until the enlargements 20, 21 enter the annular space 15, allowing the arms 18, 19 to return to the rest position.

In this position the outer surface 22 of the enlargements is butted against the undercut surface 17 of the annular space 15.

On complete insertion of the balance weight 8 into the circumferential slot 7, the base 25 engages laterally with the surfaces 23, 24 of the opening, thereby preventing the balance weight 8 from moving transversely relative to the slot 7.

By means of the geometrical coupling effected between the enlargements 20, 21 and the annular space 15, even without preventing the elastic movement of the arms 18, 19, the balance weight 8 does not come out of the circumferential slot 7 when the tool holder is spun.

Only the base 25 of the balance weight 8 is in contact with the surfaces 23, 24 of the opening 16.

For this reason the weight 8 encounters a low resistance to being moved inside the slot 7.

The balance weights 8 are therefore free to move in the circumferential slot and it is therefore possible to vary the position of the centre of gravity of the tool holder relative to its axis of rotation.

Using the graduated scale on the edge of the circumferential slot together with the vernier scale on the balance weight 8 it is possible to accurately adjust the angular position of the balance weight 8 in the slot 7 in order to balance the tool holder 1 and the tool connected to it.

In order to prevent the balance weight 8 sliding about inside the slot 7 during the rotation of the tool holder 1, the set screw 103 is inserted in the tapped hole 101. This keeps the spring arms 18, 19 apart.

The set screw 103 presses against the blind end of the slot 7 and pushes the enlargements 20, 21 against the surface 17 of the annular space 15, thus immobilizing the weight 8 inside the slot.

What is claimed is:

1. A rotary tool holder (1) fitted with a balance device having balance weights (8) that are positionable relative to the body (5) of the tool holder, wherein the body (5) of the tool holder possesses a T-section circumferential slot (7), the slot (7) houses balance weights (8) having in section the form of a U, the arms (18, 19) of the body of the U are elastically deformable and possess terminal enlargements (20, 21) that fit into the undercut part of the slot (7), and the body of each weight (8) contains a tapped through hole (101) that takes a set screw (103) for locking it to the slot (7).

2. A tool holder (1), as claimed in claim 1, wherein there is a graduated scale (10) on one edge (9) of the circumferential slot (7).

3. A tool holder (1), as claimed in claim 1, wherein the balance weights (8) display a vernier scale.

4. A tool holder (1), as claimed in claim 1, wherein the circumferential slot (7) completely houses the bodies of the balance weights (8).

5. A tool holder (1), as claimed in claim 1, wherein the circumferential slot (7) housing the balance weights (8) is situated in an annular body (40) and the annular body (40) is removably connected to the body (5) of the tool holder (1).

* * * * *